Patented Feb. 6, 1951

2,540,239

UNITED STATES PATENT OFFICE 2,540,239

INSECTICIDAL PAINT

Garfield Arthur Bowden, East Orange, N. J., and Carl Iddings, Manhasset, N. Y., assignors to Boyle-Midway Inc., New York, N. Y., a corporation of Delaware No Drawing. Application February 5, 1945, Serial No. 576,370

9 Claims. (Cl. 106—15)

This invention relates to an insecticidal coating composition and particularly relates to an oil type of paint or varnish containing small amounts of 2,2-bis(p-chlorophenyl)1,1,1-trichloroethane, referred to hereinafter as DDT.

One object of the present invention is to provide a coating composition, which upon application to a suitable surface, is capable of drying to give a coated surface that manifests a high degree of insecticidal activity against flies and many other insect pests over a period of many months.

Another object of the invention is to provide a means of substantially abolishing the prevalence of flies and other insect pests in human habitations and stores, and thereby diminish the spread of diseases.

A specific object of the invention is to provide an oil type paint or oil varnish containing DDT.

According to our invention, a small amount of DDT is incorporated into an oil type paint or varnish in the presence of preferably about 10 to about 40% by weight of a volatile organic solvent for the DDT, which solvent has such a volatility that the initially dry oil film retains some of the solvent residually. The volatile organic solvent, carrying a portion of the added DDT, apparently migrates to the surface as the paint dries. On the other hand the oil upon oxidation forms a film that is permeable to the organic solvent and that acts to trap at or upon its surface the crystallizing DDT which is deposited as the concentration of the DDT increases by virtue of the volatilization of the solvent. Regardless of the explanation, the fact remains that after drying and standing for some time, the paint compositions of this invention yield surfaces upon which can be seen numerous crystals of DDT upon examination under a microscope even at low magnification.

The following example illustrates how the invention may be carried out in practice, but it is to be understood that the invention is in no way limited thereby to the details given therein.

Example

Five parts by weight of DDT were mixed until uniformly distributed with 95 parts by weight of an exterior oil paint formula consisting of 63% pigment and 37% vehicle, by weight. The pigment portion consisted of

| | Parts by weight |
|---|---|
| Titanium dioxide | 2.7 |
| Zinc sulfide | 34.2 |
| Lithopone | 11 |
| Barium sulfate | 34.1 |
| Magnesium silicate | 18.0 |
| | 100 | while the vehicle portion consisted of

| | Parts by weight |
|---|---|
| Resin | 8.5 |
| Linseed oil | 25.5 |
| Drier (cobalt oleate) | 2 |
| Mineral spirits | 62 |
| Water | 2 |
| | 100 |

The mineral spirits was a conventional petroleum distillate product having specific gravity at 60° F. of .7735 to .7821, and having an initial boiling point of 300° F. and an end boiling point of 400° F. The water in this case is added as a thickening agent to give the paint better thixotropic properties.

The resulting uniformly white paint was applied evenly with a brush on a panel board of dimensions 6" x 6", and dried by exposure to the air during the period of about eighteen hours. The completely dry to the touch panel board but containing residual solvent was placed under a circular glass bell jar about 7" in diameter and about 5" high, and containing thirty-five flies. Except for some flying around in the jar, the flies remained for the most part in contact with the painted panel board. After exposure for several hours to the painted panel board, the flies still appeared to be unaffected. Under the microscope no crystals of DDT could be perceived upon the surface of the coating.

After five weeks, the painted panel boards, which were now substantially completely free from residual solvent, were again placed in the bell jar with about thirty-five flies. This time, all the flies were in a "knockdown" condition after one hour and twenty minutes exposure, and at the end of three and one-half hours, all of the thirty-five flies were dead. Upon examination of the painted panel under a microscope about 50% or more of the surface of the painted panel was covered with numerous long crystals and feathery crystals of DDT, and this undoubtedly explains the efficacy of the painted surface in destroying flies. The panel had not been inspected during the interim period of five weeks. A new panel was therefore painted and observed more closely. At the end of thirty-eight hours crystals of DDT could be observed forming below the surface of the coating. At the end of forty-eight hours a few feathery crystals of DDT could be seen at and on the surface of the coating. At the end of seventy-two hours, some dull long crystals appeared while the feathery crystals of DDT increased to the extent that about 50% or more of the surface was covered with DDT crystals.

The first painted panel board was examined again at the end of four months for insecticidal activity and again, all the flies were "knockdown" in our hour and twenty minutes and were all dead within three and one-half hours. Under the microscope, numerous crystals of DDT were still evident at and on the surface of the paint coating and this undoubtedly explains the efficacy of the painted surface in destroying flies. While it is preferred that the paint compositions of this invention contain about 5 to 10% of DDT by weight, still smaller quantities such as about 1 to 3% of DDT provides a paint which is still quite effective in destroying flies and other insect pests.

The paint compositions containing the DDT may take the form of various oil type compositions. For instance, a suitable inside paint formula is as follows:

| | Parts by weight |
|---|---|
| Dry titanium dioxide pigment | 565 |
| Raw linseed oil | 271 |
| Damar varnish | 78 |
| Petroleum spirits, boiling point 194° to 248° F | 194 |
| Ultramarine blue in oil | .5 |
| Paint drier | 36 |
| DDT | 57 |

A suitable inside flat paint formula is

| | Parts by weight |
|---|---|
| Dry zinc oxide | 1287 |
| Raw linseed oil | 281 |
| Petroleum spirits, boiling point 194° to 248° F | 231 |
| Ultramarine blue in oil | .5 |
| Paint drier | 44 |
| DDT | 92 |

A suitable formula for white enamel paint is

| | Pounds |
|---|---|
| Modified pentaerythritol ester of rosin | 100 |
| Castor oil | 120 |
| Raw linseed oil | 38.8 |
| Mineral spirits | 204.8 |
| Drier—1 lb. lead in the form of lead resinate plus .1 lb. cobalt in the form of cobalt resinate. | |
| DDT | 23.2 |

The modified pentaerythritol ester of rosin which is a reaction product of pentaerythritol and a rosin acid such as abietic acid prepared as disclosed in U. S. Patent No. 1,820,265, castor oil and raw linseed oil are cooked together a short time, and then the mineral spirits containing the dissolved DDT is added to thin the vehicle. To ⅘ gal. of this vehicle is added 5 lbs. of a rutile titanium dioxide containing some calcium sulfate as an extender, and after grinding in the usual way to secure even distribution of the pigment, the driers are added.

Most any suitable oil of the unsaturated type may be used in place of the linseed oil provided they oxidize upon exposure to air to form an organic solvent permeable film upon which the DDT is retained as it crystallizes out from the volatile organic solvent which has permeated through the film. For example, tung oil, perilla oil, soy bean oil, oiticica and fish among the naturally occurring oils either refined or raw, may be used singly or in combination. Likewise, dehydrated oils such as dehydrated castor oil also serve to achieve the desired result. However, we prefer especially those oils having 1:4 conjugated double bonds in their chemical structure and having an iodine number of 160 to 200.

Instead of mineral spirits of the example, there may be substatuted most any volatile organic solvent for DDT so long as the volatility of the solvent is such in conjunction with the permeability of the film forming substance that deposition of DDT occurs at and upon the surface of the dried coating. Among such liquids may be mentioned turpentine, pine oil, naphthas particularly painter's naphtha having an initial boiling point of 190° F. and an end boiling point of 310° F. and a specific gravity of .8383; petroleum lacquer diluent having a specific gravity of .7349 to .7419 having an initial boiling point of 200° F. and an end boiling point of 270° F.; petroleum lighter lacquer diluent having a specific gravity of .6948 and an initial boiling point of 140° F. and an end boiling point of 200° F., benzol, xylol, butyl alcohol, amyl acetate, butyl acetate, diethyl ketone, and chlorinated hydrocarbons, such as tetrachloroethane. Such liquids are quite volatile and evaporate largely from the film coating during the initial drying period leaving a residual amount of solvent that is gradually evaporated over a period of days.

A preferred procedure in preparing the DDT coating compositions of this invention is to dissolve the DDT in the volatile organic solvent preferably mineral spirits and then stir the solution with the previously prepared oil paint or oil varnish until uniformly distributed.

However, one may also add the solid DDT to the previously prepared oil coating composition containing about 15 to 40% by weight of the aliphatic organic solvent for DDT such as mineral spirits and stir the mixture until the DDT has been uniformly incorporated.

Various transparent oil varnishes, which are in effect substantially the same type of compositions as the above described oil paints, except pigments are omitted, may also be mixed with about 1 to about 10% by weight of DDT to provide varnishes which are toxic by contact to flies and many other insect pests. Suitable formulae for this purpose are

*Spar varnish type*

| | Pounds |
|---|---|
| Modified phenol-formaldehyde resin | 100 |
| Dehydrated castor oil | 161 |
| Raw linseed oil | 116.4 |
| Mineral spirits | 301 |
| Drier—2.8 lbs. lead in the form of lead resinate plus .3 lb. manganese in the form of manganese resinate. | |
| DDT | 34 |

The modified phenol-formaldehyde resin which is prepared in accordance with the disclosure of U. S. Patent No. 1,736,757 was mixed uniformly with the dehydrated castor oil and the raw linseed oil, after which the mineral spirits containing the dissolved DDT was incorporated. Finally, the drier was added.

*Floor varnish type*

| | Pounds |
|---|---|
| Modified phenol-formaldehyde resin | 100 |
| Oiticica oil | 81 |
| Castor oil | 80 |
| Mineral spirits | 205 |
| Drier—1.9 lbs. lead in the form of lead resinate plus .2 lb. manganese in the form of manganese resinate. | |
| DDT | 23.5 |

The modified phenol-formaldehyde resin was mixed thoroughly with the oiticica oil and the castor oil, after which the mineral spirits containing the dissolved DDT was incorporated. Finally, the drier was added.

The insecticidal activity of these DDT modified oil coating compositions, obviously has great utility. Households and stores which have been painted with the paints of this invention, are protected against flies and many other insect pests such as mosquitoes, for long periods of time. Such eliminates the necessity of frequent sprayings now necessary in order to free the households and stores from such pests. An additional advantage is that the DDT apparently does not interfere in any way with the other desirable qualities of the oil coating compositions such as smoothness of surface, uniformity of coating, uniformity of color, freedom from lumpiness, and good brushability.

We claim:

1. An insecticidal substantially water-immiscible, coating composition comprising a coating composition substantially immiscible with water and containing a substantial portion of an unsaturated, fatty drying-oil constituent as the major film-forming agent, a proportion, effective as an insecticide of 2,2-bis(p-chlorophenyl) 1,1,1-trichloroethane, and an organic volatile solvent for said 2,2-bis(p-chlorophenyl) 1,1,1-trichloroethane, the amount and the volatility of said solvent being such as to cause migration of said 2,2-bis(p-chlorophenyl) 1,1,1-trichloroethane to the exterior of the coating film after an initial film has been formed.

2. The composition of claim 1; wherein the amount of organic volatile solvent falls within the range of about 10% to about 40% by weight, based on the total composition.

3. The composition of claim 1; wherein the amount of organic volatile solvent falls within the range of about 10% to about 40% by weight, based on the total composition and wherein the solvent boils within the range of about 140° F. to about 400° F.

4. The composition of claim 1; wherein the organic volatile solvent is mineral spirits.

5. The composition of claim 1; wherein the proportion effective as an insecticide, of 2,2-bis(p-chlorophenyl) 1,1,1-trichloroethane falls within the range of about 1–10%, by weight based on the total composition.

6. An insecticidal, substantially water-immiscible coating composition comprising a drying-oil paint containing a pigment, a substantial portion of an unsaturated, fatty drying-oil constituent as the major film-forming agent, a proportion, effective as an insecticide of 2,2-bis(p-chlorophenyl) 1,1,1-trichloroethane, and an organic volatile solvent for said 2,2-bis(p-chlorophenyl) 1,1,1-trichloroethane, the amount and the volatility of said solvent being such as to cause migration of said 2,2-bis(p-chlorophenyl) 1,1,1-trichloroethane to the exterior of the coating film after an initial film has been formed.

7. An insecticidal, substantially water-immiscible coating composition comprising a drying-oil enamel containing a pigment, a modified pentaerythritol ester of rosin, a substantial portion of an unsaturated, fatty drying-oil constituent as the major film-forming agent, a proportion, effective as an insecticide of 2,2-bis(p-chlorophenyl) 1,1,1-trichloroethane, and an organic volatile solvent for said 2,2-bis(p-chlorophenyl) 1,1,1-trichloroethane, the amount and the volatility of said solvent being such as to cause migration of said 2,2-bis(p-chlorophenyl) 1,1,1-trichloroethane to the exterior of the coating film after an initial film has been formed.

8. An insecticidal, substantially water-immiscible coating composition comprising a drying-oil varnish containing a modified phenol-formaldehyde resin, a substantial portion of an unsaturated, fatty drying-oil constituent as the major film-forming agent, a proportion, effective as an insecticide of 2,2-bis(p-chlorophenyl) 1,1,1-trichloroethane, and an organic volatile solvent for said 2,2-bis(p-chlorophenyl) 1,1,1-trichloroethane, the amount and the volatility of said solvent being such as to cause migration of said 2,2-bis(p-chlorophenyl) 1,1,1-trichloroethane to the exterior of the coating film after an initial film has been formed.

9. An insecticidal drying-oil paint composition comprising an oil paint composition substantially immiscible with water and containing resin and unsaturated vegetable oil as film-forming constituents, a proportion, effective as an insecticide of 2,2-bis(p-chlorophenyl) 1,1,1-trichloroethane, and about 25% by weight as based on total composition of a mineral spirits solvent for said 2,2-bis(p-chlorophenyl) 1,1,1-trichloroethane, said solvent boiling within the range of about 300° F. to about 400° F., wherein the amount and the volatility of said solvent is selected so as to cause migration of said 2,2-bis(p-chlorophenyl) 1,1,1-trichloroethane to the exterior of the coating film after an initial permeable film has been formed.

GARFIELD ARTHUR BOWDEN.
CARL IDDINGS.

REFERENCES CITED

The following references are of record in the file of this patent:

UNITED STATES PATENTS

| Number | Name | Date |
|---|---|---|
| Re. 22,700 | Muller | Dec. 4, 1945 |
| 1,689,008 | Biddle | Oct. 23, 1928 |
| 1,752,232 | Coddington | Mar. 25, 1930 |
| 1,958,418 | Calcott | May 15, 1934 |
| 2,097,339 | Patterson et al. | Oct. 26, 1937 |
| 2,159,550 | Cross | May 23, 1939 |
| 2,329,074 | Muller | Sept. 7, 1943 |
| 2,346,409 | Anderson | Apr. 11, 1944 |
| 2,390,887 | Kling | Dec. 11, 1945 |

FOREIGN PATENTS

| Number | Country | Date |
|---|---|---|
| 547,874 | Great Britain | Sept. 15, 1942 |

OTHER REFERENCES

Journal of the Council for Scientific and Industrial Research, Australia, August 1946, pages 225–232.

Nature, October 21, 1944, pages 512–513.

Paint Technology, December 1944, pages 261–264.